United States Patent [19]
Park et al.

[11] Patent Number: 5,311,544
[45] Date of Patent: May 10, 1994

[54] RECEIVER OF A DIRECT SEQUENCE SPREAD SPECTRUM SYSTEM

[75] Inventors: Jong-hyun Park, Seoul; Je-woo Kim, Suwon, both of Rep. of Korea

[73] Assignee: SamSung Electronics Co., Ltd., Suwon, Rep. of Korea

[21] Appl. No.: 979,053

[22] Filed: Nov. 19, 1992

[51] Int. Cl.⁵ .................................. H04L 27/30
[52] U.S. Cl. .......................... 375/1; 380/34; 375/106
[58] Field of Search ............... 375/1, 34, 115, 116, 375/119, 120, 106

[56] References Cited

U.S. PATENT DOCUMENTS 5,157,686 10/1992 Omura et al. ......................... 375/1

Primary Examiner—Bernarr E. Gregory
Attorney, Agent, or Firm—Robert E. Bushnell

[57] ABSTRACT

A receiver of a direct sequence spread spectrum system includes a period counter for counting a period of a system clock, and outputting a data demodulation signal approximately every half-PN period, a peak detector for detecting a peak in the output from an adder until reaching a data demodulation point for every data demodulating period, and outputting the value of the peak to the period counting means, a peak position detector for recognizing the detection of the peak in the peak detecting means, storing a current position of the peak from the period counting means, and then providing the peak position at a data demodulation point after the ending of one period, a timing recovery circuit for receiving position information about the current peak position from the peak position detecting means when beginning every data demodulation operation, and controlling the period counting means to move the peak position to allow the peak position of the following period to be observed in a desired position, and demodulator for demodulating the data whenever the peak is observed. Thus, the data can be stably demodulated by compensating for the influence due to a clock differential between the transmitting and receiving stages or fading.

18 Claims, 3 Drawing Sheets

RECEIVER OF A DIRECT SEQUENCE SPREAD SPECTRUM SYSTEM

BACKGROUND OF THE INVENTION

The present invention relates to a receiver of a direct sequence spread spectrum system, and more particularly to a timing recovery circuit in a receiver of a direct sequence spread spectrum system.

In realizing a direct sequence spread spectrum (hereinafter referred to as DS/SS) system, initial synchronization and synchronization tracing are required for corresponding pseudo-noise (PN) codes of transmitting and receiving stages. The DS/SS system utilizing a digital matched filter can easily perform initial synchronization and synchronization tracing, but still has problems with clock differences between the transmitting and receiving stages, the influence of fading, etc., which should be compensated for.

FIG. 1 is a block diagram showing a DS/SS system of a prior art.

In FIG. 1, a signal received via an antenna 201 is mixed with the output of a carrier wave generator 203 in a mixer 202, and then is output as an intermediate frequency (IF) signal via a bandpass filter 204. The IF signal is first multiplied by the output of an IF generator 206 in multipliers 205 and 208 for initial synchronization, wherein the in-phase I of the output from IF generator 206 is multiplied in the I-loop and the quadrature-phase Q of the output is multiplied in the Q-loop, thereby obtaining pseudo-noise (PN) signals without IF components. The PN signals of the I-loop and Q-loop are each converted in analog-to-digital converters 211 and 213 via low-pass filters 209 and 210, and then input to matched filters 214 and 215, respectively. Correlation between the output from a reference PN code generator 212 and the received PN signals are obtained via matched filters 214 and 215, and the obtained correlations are squared in squaring units 216 and 217, respectively. Then, the results are summed in an adder 218. By observing the output of adder 218, a peak detector 219 detects a peak in one period of a PN code and a peak position detector 220 outputs the position of the peak. Once the position of the peak value in one period of the PN code is determined, and then one period of the PN code is terminated, the difference between the peak position in the current period (output of peak detector 220) and the peak position in the previous period (output of delay circuit 221) is obtained via a subtractor 222.

At this time, the difference between the peak positions of the current and the previous periods can be considered as the clock differential between the transmitting and receiving stages. Accordingly, by varying the clock of the receiving stage corresponding to the difference, the clocks of the transmitting and receiving stages can be synchronized. In other words, the difference of the peak positions is converted into an analog signal in a digital-to-analog converter 223 and then is input to a voltage controlled oscillator 225 via a loop filter 224. Thus, the system clock which is utilized throughout the receiving stage can be synchronized with the clock of the transmitting stage. Meanwhile, an average value of previous peak position values with respect to several periods from a delay circuit 221 may be employed, in order to obtain more accurate information.

Data is demodulated in a demodulator 227, using the output of matched filter 214 when the peak value of one period is detected in peak detector 219.

Therefore, the conventional receiver adopts an analog circuit for recovering timing, which impedes miniaturization and degrades the reliability of the system.

SUMMARY OF THE INVENTION

It is the object of the present invention to provide a receiver of a direct sequence spread spectrum system, using a digital circuit.

To achieve the object of the present invention, there is provided a receiver of a direct sequence spread spectrum system comprising:

period counting means for counting a period of a system clock and outputting a signal for commanding data demodulation approximately every half-PN period;

peak detecting means for detecting a peak in the output from an adder until reaching a data demodulation point for every data demodulation period, and outputting the value of the peak to the period counting means;

peak position detecting means for recognizing the detection of the peak in the peak detecting means, storing a current position of the peak from the period counting means, and then providing the peak position at a data demodulation point after the ending of one period;

timing recovery means for receiving position information about the current peak position from the peak position detecting means when beginning every data demodulation operation, and controlling the period counting means to move the peak position to allow the peak position of the following period to be observed in a desired position; and demodulating means for demodulating the data whenever the peak is observed.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
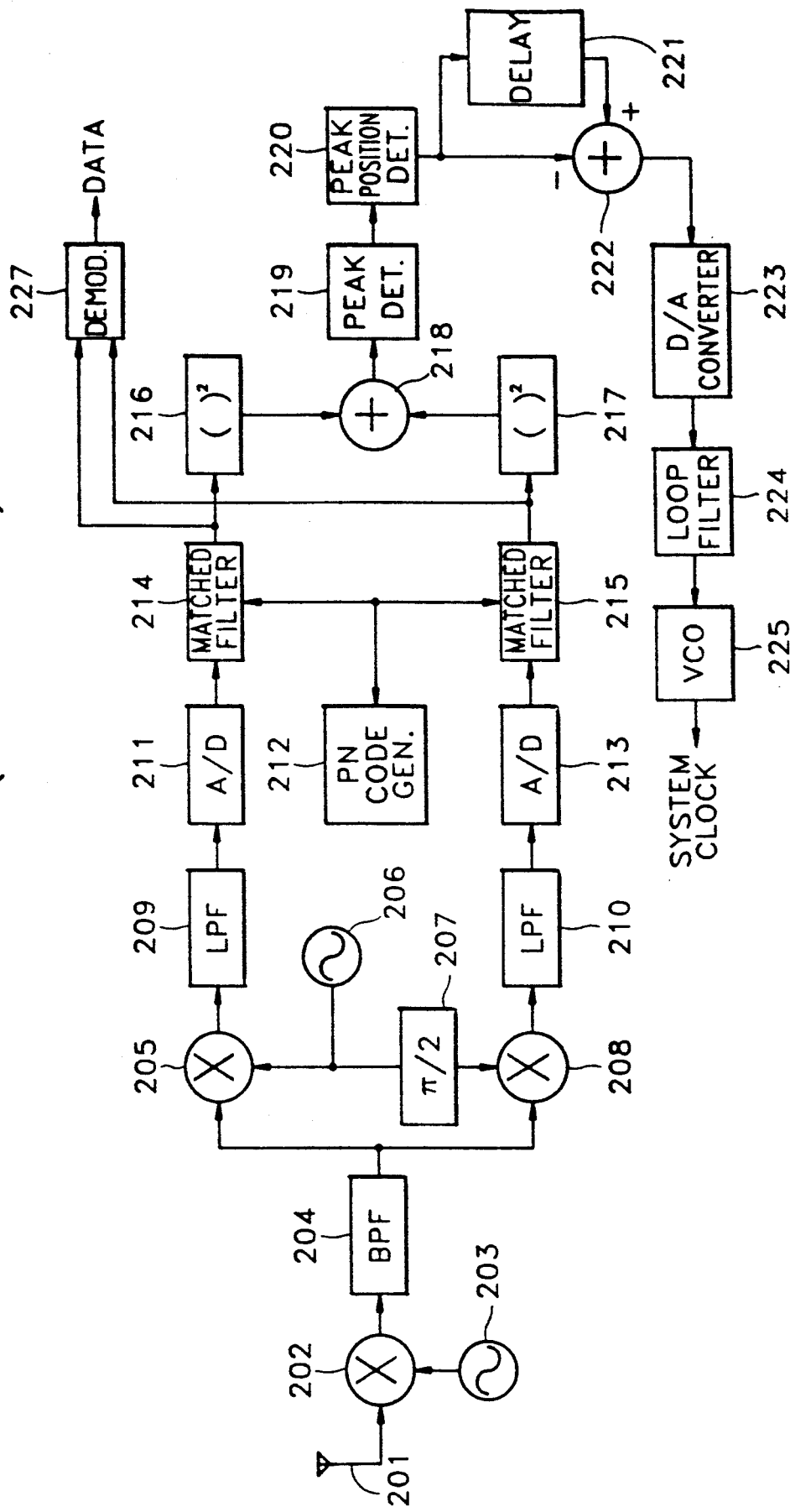
FIG. 1 is a block diagram showing the receiver of a direct sequence spread spectrum system of a prior art.
Figure 2:
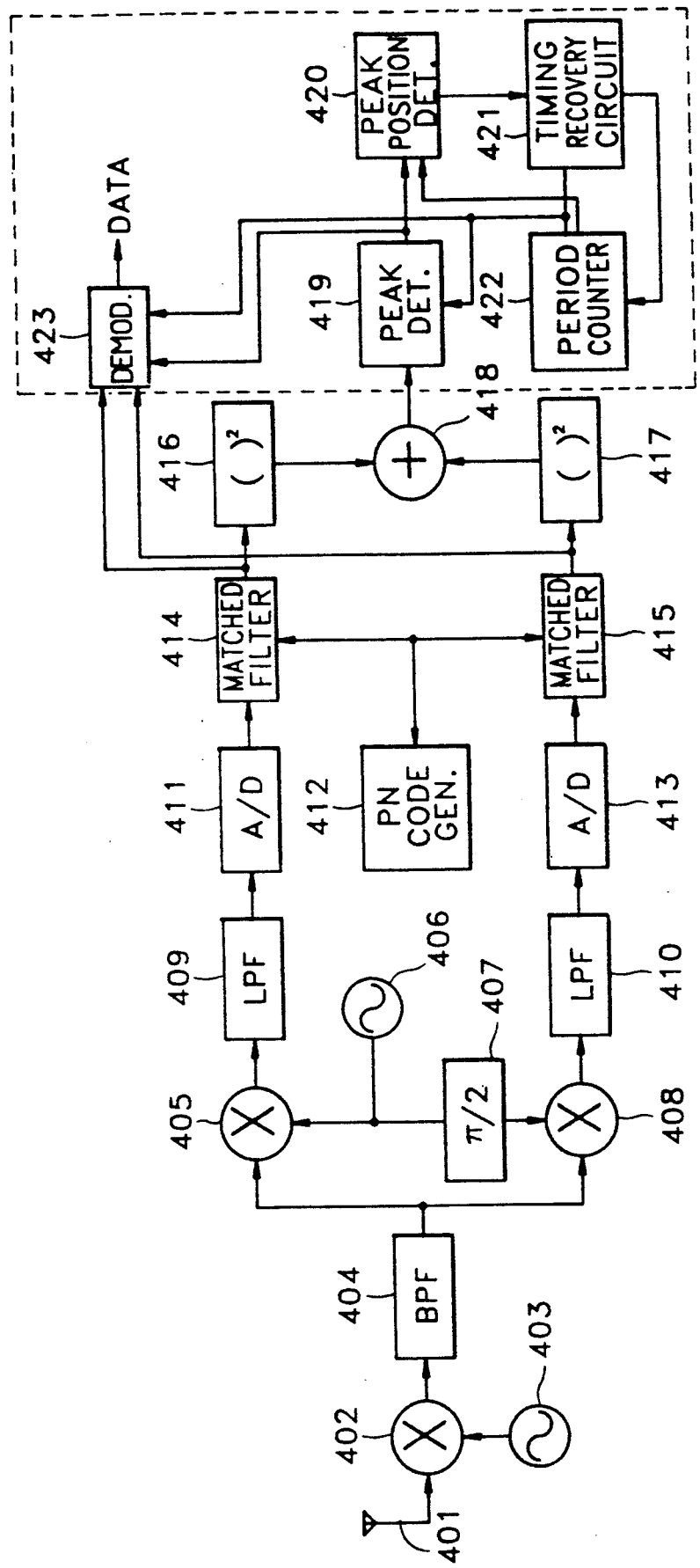
FIG. 2 is a block diagram showing the receiver of a direct sequence spread spectrum system according to the present invention.

Referring to FIG. 2, the receiver of a direct sequence spread spectrum (DS/SS) system according to the present invention is identical to that of FIG. 1, except for the blocks enclosed by the dotted line.

The above DS/SS system further comprises: a peak detector 419 for detecting a peak value from the output of an adder 418; a peak position detector 420 for detecting the peak position from the output signals of peak detector 419 and a period counter 422; a demodulator 423 for demodulating data at a data demodulation point designated by period counter 422 when the peak is detected, using the outputs from matched filters 413 and 414; a period counter 422 for determining the data demodulation point by counting system clocks; and a timing recovery circuit 421 for receiving peak position from peak position detector 420 and controlling period counter 422.

Hereinbelow, the operation of system constructed as above will be described.

To begin with, period counter 422 generates a signal for determining the data demodulation point by counting the system clock (clock of ½ chip rate) and outputting a data demodulation signal for every period of PN code. However, the accurate counting time of period counter 422 is continuously controlled by timing recovery circuit 421, so that the counting may be minutely varied. Also, peak position detector 420 informs where a currently observed output of adder 418 is placed within one period.

Peak detector 419 detects the peak in the output of adder 418 for each data demodulation period, until reaching a data demodulation point. Then, whenever the peak detecting signal is output, demodulator 423 stores the outputs from matched filters 414 and 415 and peak position detector 420 stores a current position from period counter 422.

Peak position detector 420 recognizes the detection of the peak in peak detector 419 and stores the position where the current peak is observed which is output from period counter 422. Then, peak position detector 420 provides the detected position of the peak to timing recovery circuit 421.

Timing recovery circuit 421 receives position information about the observed current peak from peak position detector 420 during each data demodulation, and then controls period counter 422 to move the peak position, so that the peak position can be observed in a predetermined position in the following period.

Demodulator 423, upon storing the outputs of matched filters 411 and 412 corresponding to peak detection, reproduces data and a data clock when period counter 422 informs of the data demodulation point.

Since timing recovery circuit 421 controls period counter 422 using peak position information of peak position detector 420, the peak can be always observed in the desired position, so that the clock differential between the transmitting and receiving stages, fading influence on the peak observed at the data demodulation point can be compensated. Thus, data can be demodulated without errors.

Figure 3:
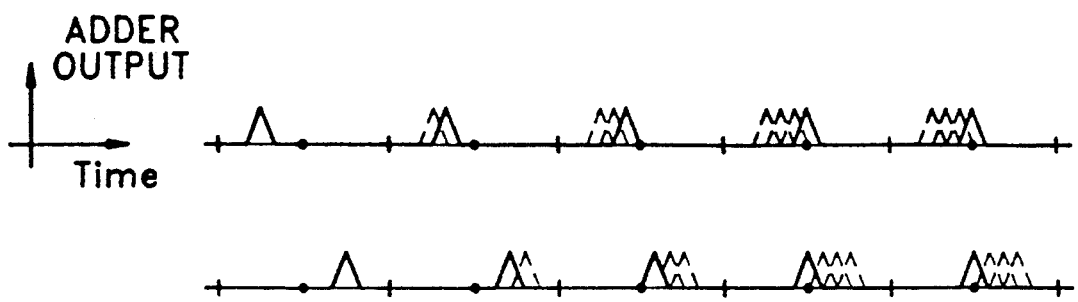
FIGS. 3, 4 and 5 are views for illustrating timing recovery methods, using actual peak positions.
Figure 4:
Figure 5:
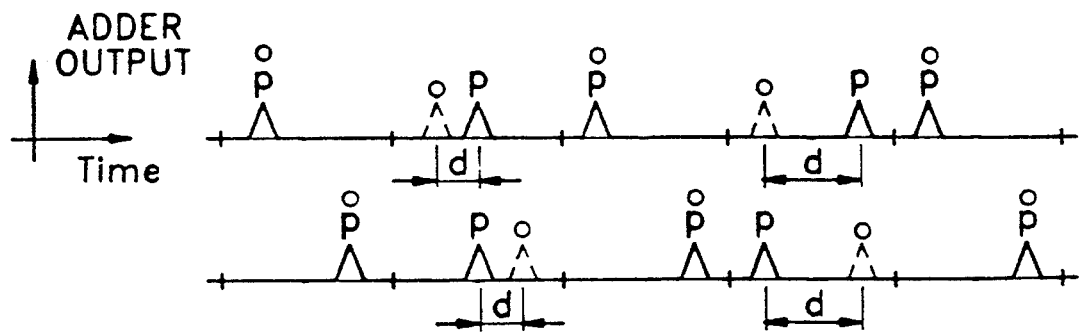

FIGS. 3, 4 and 5 are views for illustrating a timing recovery method, using actual peak positions of peak position detector 420.

In FIG. 3, 4 and 5, the transversal axis denotes time, and a longitudinal axis denotes the output of the adder. Here, each dot appearing along the transversal axis represents a specific position where observation of a peak is desired, each short vertical line drawn through the transversal axis represents the starting point of one period, segments labeled "d" represent the time differential between the specific position and the currently observed peak position, and pulses labeled "p" represent a peak observed during a current period. Small circles appearing in FIG. 5 represent peaks observed in advance. The upper half of each Figure shows the peaks being observed before the desired peak position, and the lower halves show them occurring after the desired specific position. Also, dashed-lined peaks are those previously observed and solid-lined peaks are currently observed.

FIG. 3 illustrates timing recovery according to a first method. Here, observation of the peak is desired at a specific position of one period. For this end, the peak position is moved by one clock period for each PN code, so that the peak position is fixed to the specific position.

FIG. 4 illustrates timing recovery according to a second method. Here, observation of the peak is also desired at a specific position of one period, but the peak position is moved by the difference between the specific position and the currently observed peak position. Therefore, the peak position can be observed in the desired specific position of the following period.

FIG. 5 illustrates timing recovery according to a third method, wherein the peak is held constant at a peak position observed at a certain moment. Here, the difference between the peak positions of a current period and the previous period is adjusted for every period, so that the peak can be held constant at the observed peak position.

As shown in FIGS. 3, 4 and 5, it can be noted that the peak position is moved to a desired specific position with the lapse of time, and then is held constant at in the desired position. A circuit for embodying the above methods is simple. That is, only period counter 422 is manipulated, to reflect the difference between the desired peak position and the currently observed peak position.

For example, in the first method, since the current peak antecedes the specific position where the desired peak is observed, and the peak is drawn close to the specific position by adjusting one clock period for each PN code, the counted clock periods number one less than that of the PN code. If so, the ending point of the counting is advanced by one clock period, so that the peak position observed in the following period is moved toward the specific position by one clock period. By continuing such an operation, the observed peak position becomes the specific position, and thereafter the peak is held constant at the specific position. In the same manner, if the observed current peak occurs after the desired specific position, period counter 422 is controlled to count the clock one period beyond the time corresponding to one period of the PN code, whereupon the peak position observed thereafter is moved toward the specific position.

The same principle is applied to the second method. That is, once the peak actually begins to be observed in the desired specific position, the circuitry designated by the dotted portion of FIG. 2 continuously maintains the peak at the specific position.

Meanwhile, the minute change in the period of period counter 422 is slight, relative to that in the period of the PN code. Also, the relocation of the peak position caused by a clock differential between the transmitting and receiving stages or fading is insignificant with respect to the clock period. Thus, since the peak position is stably observed within a short period, the influence on the peak position movement does not function as a factor degrading system performance.

Accordingly, the timing recovery circuit of the direct sequence spread spectrum system according to the present invention restores timing, utilizing a digital circuit, so that influence due to the clock differential between transmitting and receiving stages or fading is compensated for. As a result, data can be stably demodulated.

While the present invention has been particularly shown and described with reference to particular embodiments thereof, it will be understood by those skilled in the art that various changes in form and details may be effected therein without departing from the true spirit and scope of the invention as defined by the appended claims.

What is claimed is:

1. A receiver of a direct sequence spread spectrum system comprising:
   period counting means for counting a period of a system clock, and outputting a signal for commanding data demodulation approximately every half-PN period;
   peak detecting means for detecting a peak in the output from an adder until reaching a data demodulation point for every data demodulation period, and outputting the value of said peak to said period counting means;
   peak position detecting means for recognizing the detection of said peak in said peak detecting means, storing a current position of said peak from said period counting means, and then providing said peak position at a data demodulation point after the ending of one period;
   timing recovery means for receiving position information about said current peak position from said peak position detecting means when beginning every data demodulation operation, and controlling said period counting means to move said peak position to allow the peak position of the following period to be observed in a desired position; and
   demodulating means for demodulating the data whenever said peak is observed.

2. A receiver of a direct sequence spread spectrum system as claimed in claim 1, wherein said timing recovery means, for allowing said peak to be observed at a specific position, accumulates the difference value of the current peak position and said specific peak position, and approaches said current peak position one by one for every period to said specific peak position.

3. A receiver of a direct sequence spread spectrum system as claimed in claim 1, wherein said timing recovery means, for allowing said peak position to be observed at a specific position, accumulates the difference value of the current peak position and said specific peak position, and approaches said current peak position by the difference value at next period to said specific peak position.

4. A receiver of a direct sequence spread spectrum system as claimed in claim 1, wherein said timing recovery means, determines the current peak position to be observed at a certain period as a specific peak position, accumulates the difference value of the current peak position and said specific peak position, and approaches said current peak position by the difference value at next period to said specific peak position.

5. A receiver of a direct sequence spread spectrum system having in-phase (I-loop) and quadrature-phase (Q-loop) means each utilizing a digital matched filter, comprising:
   squaring means for respectively squaring outputs from said digital matched filters of said I-phase and Q-phase means;
   adding means for adding the output signals of said squaring means;
   period counting means for counting a period of a system clock, and outputting a signal for commanding data demodulation approximately every half-PN period;
   peak detecting means for detecting a peak in the output from said adding means until reaching a data demodulation point for every data demodulation period;
   peak position detecting means for storing a current peak position output from said period counting means while said peak is being detected, and outputting peak position at data demodulation point after the ending of one period;
   timing recovery means for receiving said current position from said peak position detecting means when beginning every data demodulation operation, and controlling said period counting means to move said peak position to allow the peak position of the following period to be observed in an accurate position; and
   demodulating means for storing said outputs from said digital matched filters when said peak was detected, and then reproducing data and a data clock signal by receiving said data demodulation point from said period counting means.

6. A receiver of a direct sequence spread spectrum system as claimed in claim 5, wherein said timing recovery means, for allowing said peak position to be observed at a specific position, accumulates the difference value of the current peak position and said specific peak position, and approaches said current peak position one by one for every period to said specific peak position.

7. A receiver of a direct sequence spread spectrum system as claimed in claim 5, wherein said timing recovery means, for allowing said peak position to be observed at a specific position, accumulates the difference value of the current peak position and said specific peak position, and approaches said current peak position by the difference value at next period to said specific peak position.

8. A receiver of a direct sequence spread spectrum system as claimed in claim 5, wherein said timing recovery means, determines the current peak position to be observed at a certain period as a specific peak position, accumulates the difference value of the current peak position and said specific peak position, and approaches said current peak position by the difference value at next period to said specific peak position.

9. A receiver of a direct sequence spread spectrum system including mixing means for mixing a received signal with a carrier wave signal; a bandpass filter for bandpass-filtering the signal from said mixing means to generate an intermediate frequency (IF) signal; I-loop means and Q-loop means wherein said IF signal is summed with the output of an IF generator in multipliers, the I-phase of said output from said IF generator is multiplied in said I-loop means and the Q-phase thereof is multiplied in said Q-loop means to generate respective pseudo-noise (PN) signals without IF components, and each PN signal of said I-loop and Q-loop means passes through respective low-pass filters and then is converted into digital signals in analog-to-digital converters, thereby being filtered by digital matched filters; and adding means for summing the output signals from said I-loop means and Q-loop means, wherein said receiver of a direct sequence spread spectrum system comprises:
   period counting means for counting a period of a system clock, and outputting a signal for commanding data demodulation approximately every half-PN period;
   peak detecting means for detecting a peak in the output from said adding means until reaching a data demodulation point for every data demodulation period;

peak position detecting means for storing a current position of said peak output from said period counting means while said peak is being detected, and outputting said peak position at a data demodulation point after the ending of one period;

timing recovery means for receiving said current position from said peak position detecting means when beginning every data demodulation operation, and controlling said period counting means to move said peak position to allow the peak position of the following period to be observed in an accurate position; and demodulating means for storing said outputs from said digital matched filters when said peak was detected, and then reproducing data and a data clock signal by receiving said data demodulation point via said period counting means.

10. A receiver of a direct sequence spread spectrum system as claimed in claim 9, wherein said timing recovery means, for allowing said peak position to be observed at a specific position, accumulates the difference value of the current peak position and said specific peak position, and approaches said current peak position one by one for every period to said specific peak position.

11. A receiver of a direct sequence spread spectrum system as claimed in claim 9, wherein said timing recovery means, for allowing said peak position to be observed at a specific position, accumulates the difference value of the current peak position and said specific peak position, and approaches said current peak position by the difference value at next period to said specific peak position.

12. A receiver of a direct sequence spread spectrum system as claimed in claim 9, wherein said timing recovery means, determines the current peak position observed at a certain period as a specific peak position, accumulates the difference value of the current peak position and said specific peak position, and approaches said current peak position by the difference value at next period to said specific peak position.

13. A receiver of a direct sequence spread spectrum system, comprising:

means for generating in-phase loop signals from in-phase demodulation of a transmitted signal;

means for generating a quadrature-phase loop signals from quadrature-phase demodulation of said transmitted signal;

period counting means for generating a demodulation control signal indicative of predicted peaks values of summations of squared said in-phase loop signals and squared said quadrature-phase loop signals, said demodulation control signal for commanding data demodulation approximately at a midpoint of every period of a pseudo-noise code;

peak detecting means for generating current peak signals indicative of detection of current peaks values of said summations;

peak position detecting means for generating current peak position information by comparing said current peak signals to the demodulation control signal of the current period of said psuedo-noise code;

timing recovery means for controlling said period counting means to move a predicted peak position for a subsequent period by only a single period of a system clock in response to said current peak position information so that generation of said demodulation control signal corresponds to said midpoint of every period of said pseudo-noise code; and demodulating means for demodulating the data in response to said demodulation control signal.

14. A receiver of a direct sequence spread spectrum system, comprising:

means for generating in-phase loop signals from in-phase demodulation of a transmitted signal;

means for generating a quadrature-phase loop signals from quadrature-phase demodulation of said transmitted signal;

period counting means for generating a demodulation control signal indicative of predicted peaks values of summations of squared said in-phase loop signals and squared said quadrature-phase loop signals, said demodulation control signal for commanding data demodulation approximately at a midpoint of every period of a pseudo-noise code;

peak detecting means for generating current peak signals indicative of detection of current peaks values of said summations;

peak position detecting means for generating current peak position information indicative of time differences between said current peak signals and the demodulation control signal of the current period of said psuedo-noise code;

timing recovery means for controlling said period counting means to move a predicted peak position for a subsequent period by said time differences in response to said current peak position information so that generation of said demodulation control signal corresponds to said midpoint of every period of said pseudo-noise code; and demodulating means for demodulating the data in response to said demodulation control signal.

15. A receiver of a direct sequence spread spectrum system having in-phase loop and quadrature-phase loop each for utilizing a digital matched filter, said receiver comprising:

squaring means for respectively squaring outputs from the digital matched filters of said in-phase loop and said quadrature-phase loop;

adding means for adding the output signals of said squaring means;

period counting means for counting a period of a system clock, and for generating a demodulation control signal for commanding data demodulation approximately at a midpoint of every period of a pseudo-noise code;

peak detecting means for detecting a current peak in an output from said adding means for said every period of said pseudo-noise code;

peak position detecting means for storing a current peak position output from said period counting means while said current peak is being detected, and for providing current peak position information after the ending of one period;

timing recovery means for receiving said current peak position information from said peak position detecting means, and for controlling said period counting means to move a predicted peak position for a following period of said pseudo-noise code in response to said current peak position information so that generation of said demodulation control signal corresponds to said midpoint of every period of said pseudo-noise code; and demodulating means for storing said outputs from said digital matched filters, and for then reproducing data and a data clock signal by receiving said demodulation control signal indicative of a data demodulation point from said period counting means.

16. A receiver of a direct sequence spread spectrum system as claimed in claim 15, further comprised of said timing recovery means adjusting said predicted peak position for said following period of said pseudo-random noise code by one clock period for every period of said pseudo-noise code so that the predicted peak positions correspond to the current peak positions.

17. A receiver of a direct sequence spread spectrum system as claimed in claim 15, wherein said timing recovery means, adjusts said predicted peak position for said following period by the difference between said predicted peak position of a current period of said pseudo-noise code and said current peak position for every period of said pseudo-noise code so that the predicted peak positions correspond to the current peak positions.

18. A receiver of a direct sequence spread spectrum system including mixing means for mixing a received signal with a carrier wave signal; a bandpass filter for bandpass-filtering the signal from said mixing means to generate an intermediate frequency signal; an in-phase loop and a quadrature-phase loop wherein said intermediate frequency signal is mixed with the output of an intermediate frequency generator in multipliers, the I-phase portion of said output from said intermediate frequency generator is multiplied in said in-phase loop and the Q-phase portion is multiplied in said quadrature-phase loop to generate respective pseudo-noise signals without intermediate frequency components, and each pseudo-noise signal of said in-phase loop and said quadrature-loop pases through respective low-pass filters, then is converted into digital signals in analog-to-digital converters, and then is filtered by digital matched filters; and adding means for summing the output signals from said in-phase loop and said quadrature phase loop, wherein said receiver of a direct sequence spread spectrum system comprises:

period counting means for counting a period of a system clock, and for generating a demodulation control signal for commanding data demodulation approximately at a midpoint of every period of pseudo-noise code;

peak detecting means for detecting a current peak in an output from said adding means for said every period of said pseudo-noise code;

peak position detecting means for storing a current peak position of said peak output from said period counting means while said current peak is being detected, and for outputting current peak position information indicative of a difference between said position of said predicted peak and the position of said current peak after the ending of one period of said pseudo-random code;

timing recovery means for receiving said current peak position information from said peak position detecting means, and for controlling said period counting means to move a predicted peak position for a following period of said pseudo-noise code in response to said current peak position information so that generation of said demodulation control signal corresponds to said midpoint of every period of said pseudo-noise code; and demodulating means for storing said outputs from said digital matched filters, and for then reproducing data and a data clock signal by receiving said demodulation control signal indicative of a data demodulation point via said period counting means.

* * * * *